United States Patent
Kim

(10) Patent No.: US 10,637,079 B2
(45) Date of Patent: Apr. 28, 2020

(54) UNIT CELL FOR FUEL CELL

(71) Applicants: Hyundai Motor Company, Seoul (KR); Kia Motors Corporation, Seoul (KR)

(72) Inventor: Jung Ik Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 73 days.

(21) Appl. No.: 16/025,294

(22) Filed: Jul. 2, 2018

(65) Prior Publication Data

US 2019/0252695 A1   Aug. 15, 2019

(30) Foreign Application Priority Data

Feb. 9, 2018 (KR) .................. 10-2018-0016449

(51) Int. Cl.
| | |
|---|---|
| *H01M 8/0258* | (2016.01) |
| *H01M 8/0297* | (2016.01) |
| *H01M 4/88* | (2006.01) |
| *H01M 8/1004* | (2016.01) |

(52) U.S. Cl.
CPC ....... *H01M 8/0297* (2013.01); *H01M 4/8807* (2013.01); *H01M 8/0258* (2013.01); *H01M 8/1004* (2013.01)

(58) Field of Classification Search
None
See application file for complete search history.

(56) References Cited

U.S. PATENT DOCUMENTS

| | | | | |
|---|---|---|---|---|
| 5,294,209 | A | * | 3/1994 | Naka ................ B23Q 1/0063 403/24 |
| 9,284,993 | B1 | * | 3/2016 | Kalinsky .......... F16D 25/0635 |
| 2003/0162078 | A1 | * | 8/2003 | Kikuchi ............ H01M 8/0254 426/38 |
| 2005/0136312 | A1 | | 6/2005 | Bourgeois et al. |
| 2009/0176145 | A1 | * | 7/2009 | Inagaki .............. H01M 8/248 429/524 |
| 2009/0317688 | A1 | * | 12/2009 | Inagaki .............. H01M 8/248 429/465 |
| 2013/0149633 | A1 | | 6/2013 | Jeong |
| 2015/0037706 | A1 | * | 2/2015 | Fukuyama .......... H01M 8/02 429/468 |
| 2017/0194659 | A1 | | 7/2017 | Jin et al. |
| 2018/0159164 | A1 | * | 6/2018 | Jilani ................ H01M 8/0213 |

FOREIGN PATENT DOCUMENTS

| | | | |
|---|---|---|---|
| JP | 2008282646 A | | 11/2008 |
| JP | 2009187778 A | * | 8/2009 |
| JP | 2010212061 A | * | 9/2010 |
| JP | 2010212061 A | | 9/2010 |
| KR | 101361298 B1 | | 2/2014 |
| KR | 101766098 B1 | | 8/2017 |

* cited by examiner

*Primary Examiner* — Scott J. Chmielecki
(74) *Attorney, Agent, or Firm* — Slater Matsil, LLP

(57) ABSTRACT

A unit cell for a fuel cell includes a membrane-electrode-assembly (MEA), a gas diffusion layer disposed on one surface of the MEA, a separator plate disposed to be spaced from the gas diffusion layer, and at least one coil spring interposed between the gas diffusion layer and the separator plate to elastically support the gas diffusion layer and the separator plate while electrically connecting the gas diffusion layer with the separator plate and providing a reactant gas passage to transfer reactant gas.

19 Claims, 15 Drawing Sheets

UNIT CELL FOR FUEL CELL

CROSS-REFERENCE TO RELATED APPLICATIONS

This application claims priority to Korean Patent Application No. 10-2018-0016449, filed on Feb. 9, 2018, which application is hereby incorporated herein by reference.

TECHNICAL FIELD

The present disclosure relates to a unit cell for a fuel cell.

BACKGROUND

A fuel cell stack is a device generating, as a main power source of a fuel cell vehicle, electricity through a redox reaction of hydrogen and oxygen.

In general, the fuel cell stack is formed by stacking a plurality of unit cells including a membrane-electrode-assembly (MEA) and separator plates disposed on both sides of the MEA.

The MEA includes a polymer electrolyte membrane, an anode electrode provided on one surface of the polymer electrolyte membrane, and a cathode electrode provided on an opposite surface of the polymer electrolyte membrane. The separator plate includes a hydrogen channel for supplying hydrogen to the anode electrode, an air channel for supplying air to the cathode electrode, and a coolant channel for supplying coolant.

The anode electrode receives high-purity hydrogen supplied from a hydrogen storage tank through the hydrogen channel of the separator plate. The cathode electrode receives air in the atmosphere, which is supplied by an air supply device, such as an air compressor, through the air channel of the separator plate. Then, protons and electrons are generated in the anode electrode as the oxidation reaction of hydrogen proceeds. The generated protons and electrons are moved to the cathode electrode through the polymer electrolyte membrane and the separator plate. Additionally, in the cathode electrode, the reduction reaction proceeds in which the protons and electrons moved from the anode electrode and the oxygen in the atmosphere, which is supplied from the air supply device participate, thereby producing water and electrical energy resulting from the flow of the electrons.

Meanwhile, recently, there has been developed and used a unit cell provided to transfer air through a formed porous body or a foamable porous body by interposing the formed porous body and the foamable porous body between a separator plate and a gas diffusion layer instead of forming the air channel in the separator plate. When an air passage is formed to transfer air by using the formed porous body or the foamable porous body, the porosity of the formed porous body or the foamable porous body has to be adjusted for the design purpose of the unit cell. However, since the foamable porous body has a geometric shape randomly formed, it may be difficult to precisely adjust the porosity for the design purpose. In addition, to fabricate the formed porous body, a mold is required due to the characteristic of the fabrication process. Accordingly, the formed porous body has problems of requiring many costs in installing the mold and requiring an additional cost to change the structure of the mold in the case that a shape change is required while optimizing the formed porous body for the design purpose.

SUMMARY

Embodiments of the present disclosure can solve problems occurring in the prior art, while advantages achieved by the prior art are maintained intact.

An aspect of the present disclosure provides a unit cell for a fuel cell, which has a structure improved to precisely adjust the porosity of a reactant gas passage for the design purpose.

Another aspect of the present disclosure provides a unit cell for a fuel cell, which has a structure improved to adjust the porosity of a reactant gas passage differently depending on sections of the reactant gas passage.

Another aspect of the present disclosure provides a unit cell for a fuel cell, which has a structure improved to stably maintain the contact state between components in the unit cell.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a unit cell for a fuel cell includes a membrane-electrode-assembly (MEA), a gas diffusion layer disposed on one surface of the MEA, a separator plate disposed to be spaced from the gas diffusion layer, and at least one coil spring interposed between the gas diffusion layer and the separator plate to elastically support the gas diffusion layer and the separator plate while electrically connecting the gas diffusion layer with the separator plate, and providing a reactant gas passage to transfer reactant gas.

Preferably, the coil springs are arranged such that an axial direction of each coil spring is perpendicular to a thickness direction of the MEA.

Preferably, each coil spring is fixed to the separator plate.

Preferably, each coil spring is welded to the separator plate.

Preferably, each coil spring is bonded to the separator plate by an adhesive.

Preferably, the separator plate includes at least one locking protrusion to lock one of the coil springs.

Preferably, each coil spring is locked to the locking protrusions such that a spring pitch of the coil spring is varied depending on sections of the reactant gas passage.

Preferably, the coil springs are provided such that at least one of pitches of the coil springs, diameters of the coil springs, an overlap ratio between the coil springs, and diameters of spring wires of the coil springs is varied to vary porosity of the reactant gas passage depending on sections of the reactant gas passage.

Preferably, the coil springs are arranged to increase porosity of the reactant gas passage from an upstream of the reactant gas passage toward a downstream of the reactant gas passage.

Preferably, the coil springs are arranged such that spring pitches of the coil springs are increased from the upstream of the reactant gas passage toward the downstream of the reactant gas passage.

Preferably, the coil springs are arranged such that a coil spring having a longer spring pitch among the coil springs is positioned from the upstream of the reactant gas passage toward the downstream of the reactant gas passage.

Preferably, the coil springs are arranged such that an overlap ratio between the coil springs is decreased from the upstream of the reactant gas passage toward the downstream of the reactant gas passage.

Preferably, the coil springs are arranged such that an arrangement distance between the coil springs is increased from the upstream of the reactant gas passage toward the downstream of the reactant gas passage.

Preferably, wherein the coil springs are arranged such that a coil spring having a spring wire of a less diameter among the coil springs is positioned from the upstream of the reactant gas passage toward the downstream of the reactant gas passage.

Preferably, the coil springs are arranged such that a coil spring having a less diameter among the coil springs is positioned from the upstream of the reactant gas passage toward the downstream of the reactant gas passage.

Preferably, the coil springs are arranged such that an axial direction of each coil spring forms a specific angle with a flowing direction of the reactant gas.

Preferably, at least some of the coil springs are arranged such that axial directions of the at least some of the coil springs are parallel to the flowing direction of the reactant gas.

Preferably, at least some of the coil springs are arranged such that axial directions of the at least some of the coil springs are perpendicular to the flowing direction of the reactant gas.

Preferably, the coil springs are arranged to decrease porosity of the reactant gas passage toward a region having higher current density.

As described above, the present disclosure relates to the unit cell for the fuel cell and has the following effects.

First, according to aspects of the present invention, the porosity of the reactant gas passage, which transfers the reactant gas, is adjusted by using the coil spring, thereby precisely adjusting the porosity of the reactant gas passage for the design purpose of the unit cell and precisely adjusting the electric resistance between the gas diffusion layer and the separator plate to be matched with current density.

Second, according to aspects of the present invention, the permanent shrinkage strain of the gas diffusion layer is compensated through the elastic restoring force of the coil spring, thereby stably maintaining the contact state between components in the unit cell.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
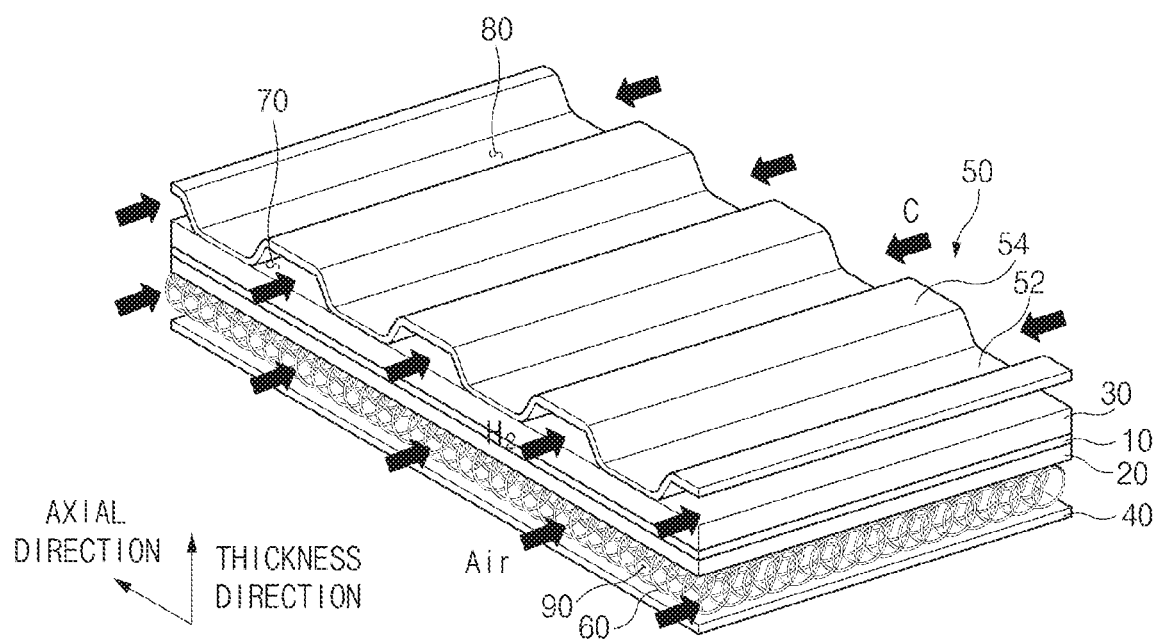
FIG. 1 is a perspective view illustrating the stack structure of a unit cell for a fuel cell according to an exemplary embodiment of the present disclosure.

Hereinafter, some embodiments of the present disclosure will be described in detail with reference to accompanying drawings. In the following description, the same reference numerals will be assigned to the same elements even though the elements are illustrated in different drawings. In addition, in the following description of an embodiment of the present disclosure, a detailed description of well-known features or functions will be ruled out in order not to unnecessarily obscure the gist of the present disclosure.

In the following description of elements according to an embodiment of the present disclosure, the terms 'first', 'second', 'A', 'B', '(a)', and '(b)' may be used. The terms are used only to distinguish relevant elements from other elements, and the nature, the order, or the sequence of the relevant elements is not limited to the terms. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
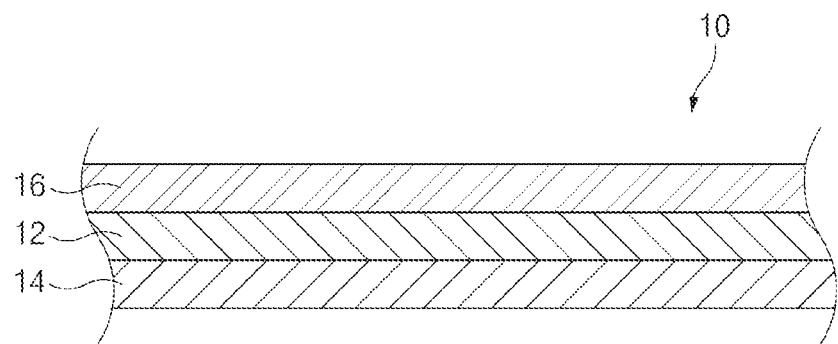
FIG. 2 is a sectional view illustrating the stack structure of an MEA.

FIG. 1 is a perspective view illustrating the stack structure of a unit cell for a fuel cell, according to an exemplary embodiment of the present disclosure, and FIG. 2 is a sectional view illustrating the stack structure of an MEA.

Referring to FIG. 1, according to an embodiment of the present disclosure, a unit cell 1 for a fuel cell (hereinafter, referred to as "unit cell 1) may include an MEA 10, a first gas diffusion layer 20 disposed on one surface of the MEA 10, a second gas diffusion layer 30 disposed on an opposite surface of the MEA 10, a first separator plate 40 disposed to be separated from one surface of the first gas diffusion layer 20, a second separator plate 50 including land parts 52 and channel parts 54 alternately formed in a specific direction and disposed on one surface of the second gas diffusion layer 30, and at least one coil spring 60 interposed between the first gas diffusion layer 20 and the first separator plate 40.

First, as illustrated in FIG. 2, the MEA 10 may include an electrolyte membrane 12, a cathode electrode 14 disposed on one surface of the electrolyte membrane 12 and an anode electrode 16 disposed on an opposite surface of the electrolyte membrane 12. Since the MEA 10 has the same structure as an MEA of a typical unit cell, the details of the MEA 10 will be omitted in the following description.

Next, as illustrated in FIG. 1, the first gas diffusion layer 20 is disposed on one surface of the cathode electrode 14 in such a manner that the first gas diffusion layer 20 is positioned at an outer portion of the unit cell 1 than the cathode electrode 14. As illustrated in FIG. 1, the second gas diffusion layer 30 is disposed on one surface of the anode electrode 16 in such a manner that the second gas diffusion layer 30 is positioned at an outer portion of the unit cell 1 than the anode electrode 16. Such gas diffusion layers 20 and 30 have the same structures as those of the gas diffusion layers of a typical unit cell, the details of the first gas diffusion layer 20 and the second gas diffusion layer 30 will be omitted in the following description.

As illustrated in FIG. 1, the first separator plate 40 is disposed to be separated from one surface of the first gas diffusion layer 20 by a specific distance such that the first separator plate 40 is positioned at an outer portion of the unit cell 1 than the first gas diffusion layer 20. The first separator plate 40 may have various shapes. For example, as illustrated in FIG. 1, the first separator plate 40 may have a flat panel shape.

Next, the second separator plate 50 is disposed on one surface of the second gas diffusion layer 30 such that the second separator plate 50 is positioned at an outer portion of the unit cell 1 than the second gas diffusion layer 30. The second separator plate 50 may include the land parts 52 and the channel parts 54 alternately formed in a specific direction. The land parts 52 and the channel parts 54 may have various shapes. For example, as illustrated in FIG. 1, the land parts 52 may have valley shapes and the channel parts 54 may have mountain shapes.

As illustrated in FIG. 1, the second separator plate 50 may be disposed on the one surface of the second gas diffusion layer 30 such that the land parts 52 are seated on the one surface of the second gas diffusion layer 30 and the channel parts 54 are separated from the one surface of the second gas diffusion layer 30. In this case, a separator plate channel fluid passage 70 may be formed between the channel part 54 and the second gas diffusion layer 30 to transfer reactant gas and produced water. A coolant passage 80 may be formed between the land part 52 of any one unit cell 1 and the first separator plate 40 of another unit cell 1 making contact with the any one unit cell 1 to transfer coolant C.

Various types of gas may be transferred through the separator plate channel fluid passage 70. For example, the separator plate channel fluid passage 70 may be configured to transfer hydrogen. In this case, the entrance (not illustrated) of the separator plate channel fluid passage 70 may be connected with a hydrogen supply line (not illustrated). The hydrogen supply line is provided to transfer hydrogen, which is supplied from a hydrogen supply source (not illustrated), toward the entrance of the separator plate channel fluid passage 70. In this case, the hydrogen supplied through the entrance of the separator plate channel fluid passage 70 is transferred to the anode electrode 16 through the second gas diffusion layer 30 and then is decomposed into protons and electrons. In addition, the exit of the separator plate channel fluid passage 70 may be connected with a hydrogen re-circulation line (not illustrated). The hydrogen re-circulation line is provided such that the hydrogen discharged from the exit of the separator plate channel fluid passage 70 is transferred to the hydrogen supply line again. Then, remaining hydrogen which fails to participate in the oxidant reaction in the anode electrode 16 may be transferred to the hydrogen supply line again through the exit of the separator plate channel fluid passage 70 and the hydrogen re-circulation line.

Figure 3:
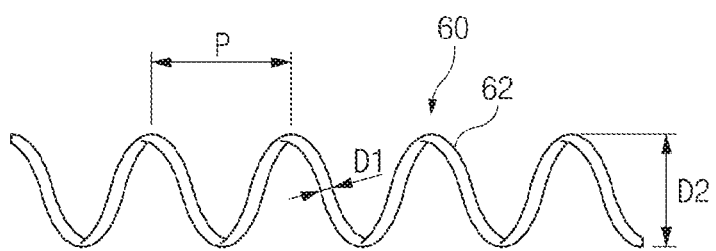
FIG. 3 is a view schematically illustrating the shape of the coil spring.

FIG. 3 is a view schematically illustrating the shape of the coil spring.

As illustrated in FIG. 3, the coil spring 60 is formed by spirally winding a spring wire 62 having a specific diameter D1. The coil spring 60 may be formed to have a specific pitch P and a specific diameter D2 for the design purpose of the unit cell 1.

The coil spring 60 is interposed between one surface of the first gas diffusion layer 20 and the first separator plate 40 to elastically support the one surface of the first gas diffusion layer 20 and the first separator plate 40 while electrically connecting the first gas diffusion layer 20 with the first separator plate 40. For example, as illustrated in FIG. 1, the coil spring 60 may be interposed between the one surface of the first gas diffusion layer 20 and the first separator plate 40 such that the axial direction of the coil spring 60 is perpendicular to a thickness direction of the MEA 10. The coil spring 60 may include the reactant gas passage 90 to transfer the reactant gas and the produced water between the first gas diffusion layer 20 and the first separator plate 40 by maintaining the distance between the first gas diffusion layer 20 and the first separator plate 40 to a specific distance.

Various types of gas may be transferred through the reactant gas passage 90. For example, the reactant gas passage 90 may be configured to transfer air. In this case, the entrance (not illustrated) of the reactant gas passage 90 may be connected with a hydrogen supply line (not illustrated). An air compressor (not illustrated) may be installed on an air supply line to pump external air to the entrance of the reactant gas passage 90. In this case, oxygen of the air supplied through the entrance of the reactant gas passage 90 is transferred to the cathode electrode 14 through the first gas diffusion layer 20 and then bonded with electrons transferred through the first separator plate 40 and protons transferred through the electrolyte membrane 12. According to the reduction reaction in which the protons, the electrons, and the oxygen participate, electrical energy and water may be produced. In addition, the entrance of the reactant gas passage 90 may be connected with an air discharge line (not illustrated). In this case, remaining air and the produced water which fail to the reduction reaction in the cathode electrode 14 may be discharged to the outside through the exist of the reactant gas passage 90 and the air discharge line.

Figure 4:
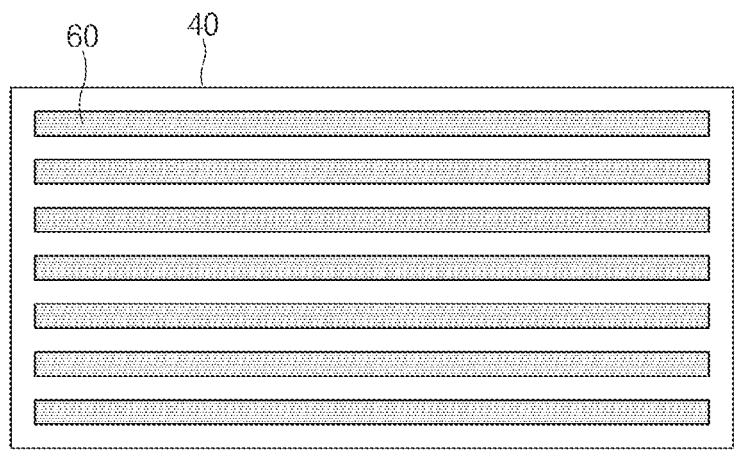
FIG. 4 is a view illustrating the state of coil springs arranged in a plurality of rows.
Figure 5A:
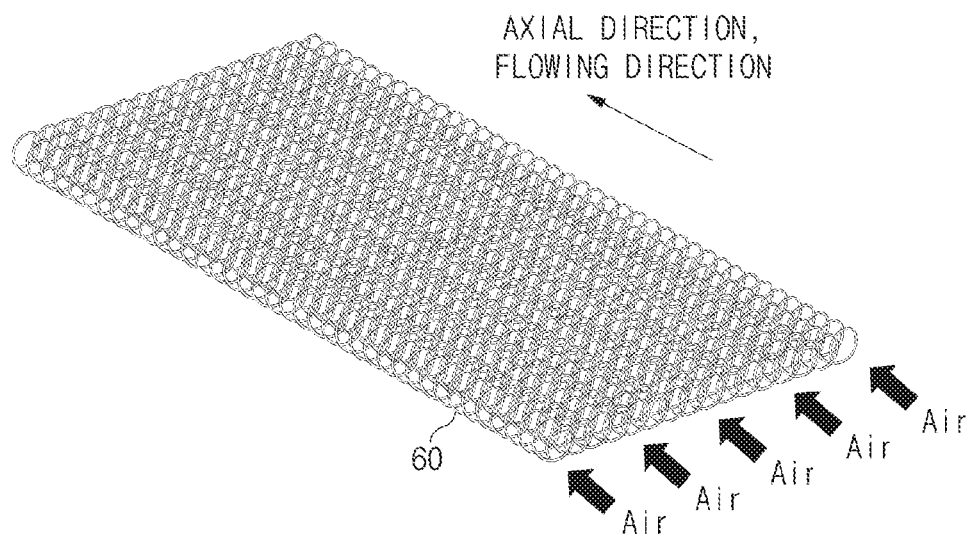
FIG. 5A is a view illustrating the state that the coil springs illustrated in FIG. 4 are arranged to be parallel to the flowing direction of the reactant gas.
Figure 5B:
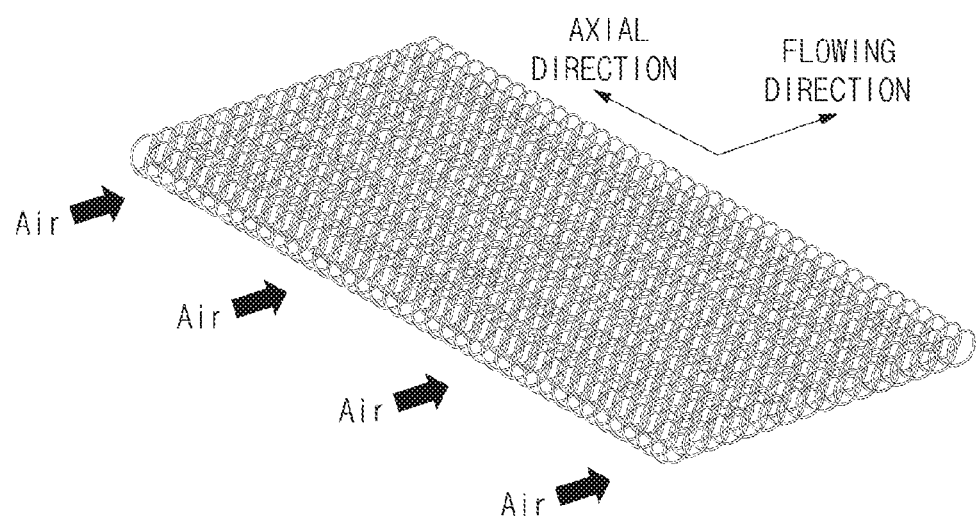
FIG. 5B is a view illustrating the state that the coil springs illustrated in FIG. 4 are arranged to be perpendicular to the flowing direction of the reactant gas.

FIG. 4 is a view illustrating the state of coil springs arranged in a plurality of rows, FIG. 5A is a view illustrating the state that coil springs illustrated in FIG. 4 are arranged to parallel to the flowing direction of the reactant gas, and FIG. 5B is a view illustrating the state that the coil springs illustrated in FIG. 4 are arranged to be perpendicular to the flowing direction of the reactant gas.

Figure 6:
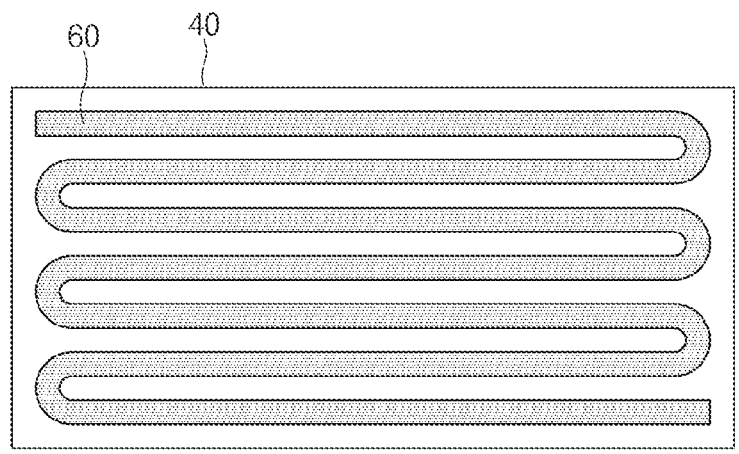
FIG. 6 is a view illustrating the arrangement state of a coil spring folded in a zig-zag pattern.
Figure 7:
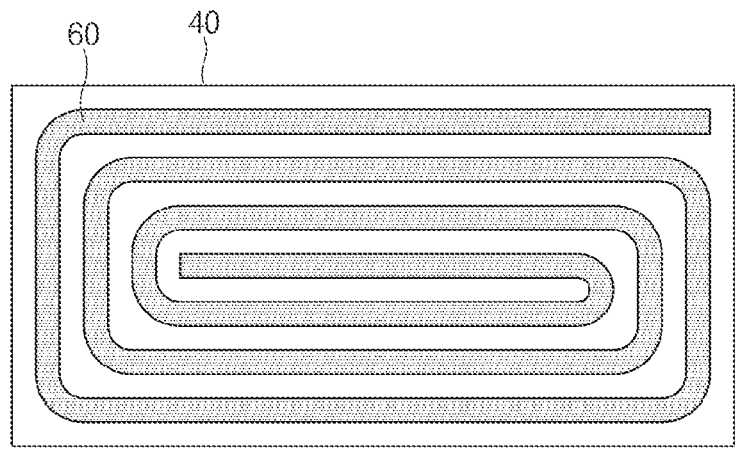
FIG. 7 is a view illustrating the arrangement state of a coil spring folded in a spiral shape.

FIG. 6 is a view illustrating the arrangement state of the coil spring folded in a zig-zag pattern, and FIG. 7 is a view illustrating the arrangement state of the coil spring folded in a spiral shape.

The coil spring 60 may be arranged in various manners.

For example, as illustrated in FIG. 4, a plurality of coil springs 60 may be arranged in a plurality of rows. In this case, the coil springs 60 may be arranged such that the axial direction of the coil springs 60 forms a specific angle with the flowing direction of air passing through the reactant gas passage 90. For example, as illustrated in FIG. 5A, at least one of the coil springs 60 may be arranged such that the axial direction of the at least one coil springs 60 is parallel to the flowing direction of the air. For example, as illustrated in FIG. 5B, at least one of the coil springs 60 may be arranged such that the axial direction of the at least one of the coil springs 60 is perpendicular to the flowing direction of the air.

For example, as illustrated in FIG. 6, at least one coil spring 60 may be arranged to be folded in a zig-zag pattern.

For example, as illustrated in FIG. 7, at least one coil spring 60 may be arranged to be folded in a spiral shape.

Figure 8:
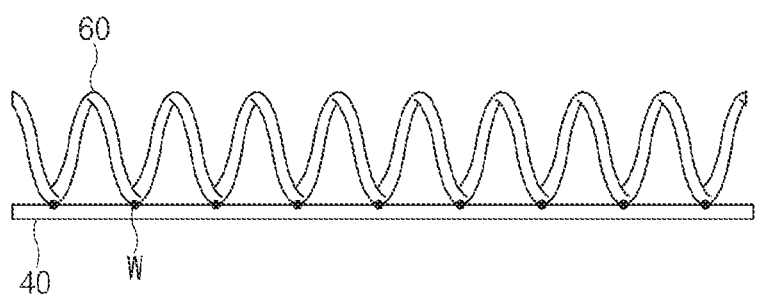
FIG. 8 is a view illustrating a coil spring welded to the first separator plate.
Figure 9A:
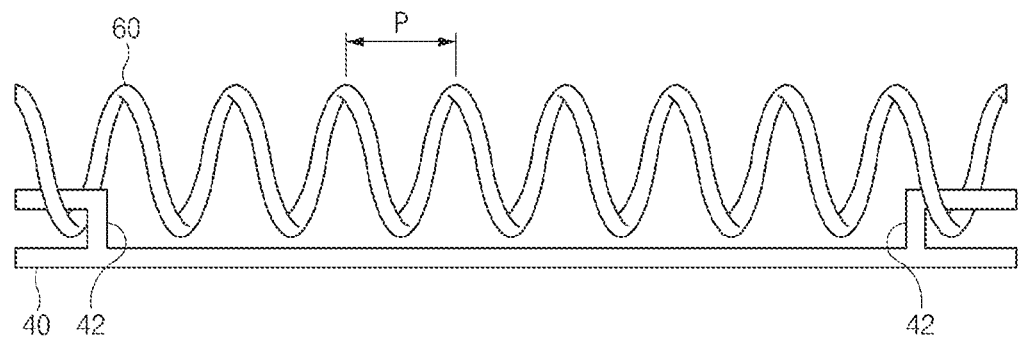
FIGS. 9A to 9C are views illustrating states that a coil spring is locked to a locking protrusion of the first separator plate.
Figure 9B:
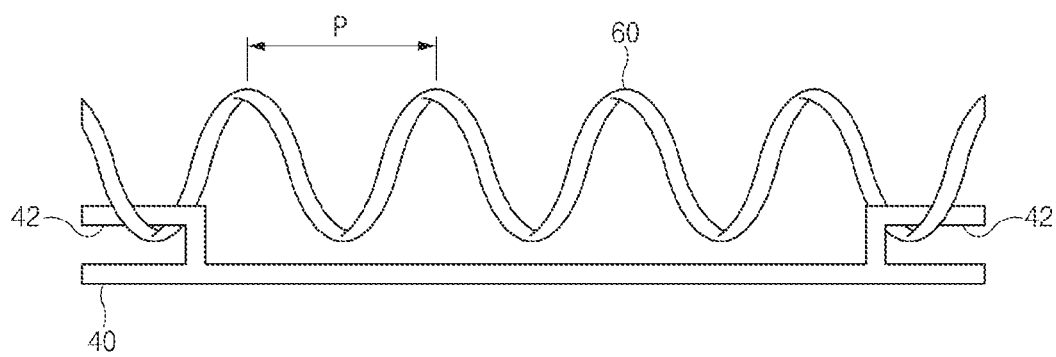
Figure 9C:
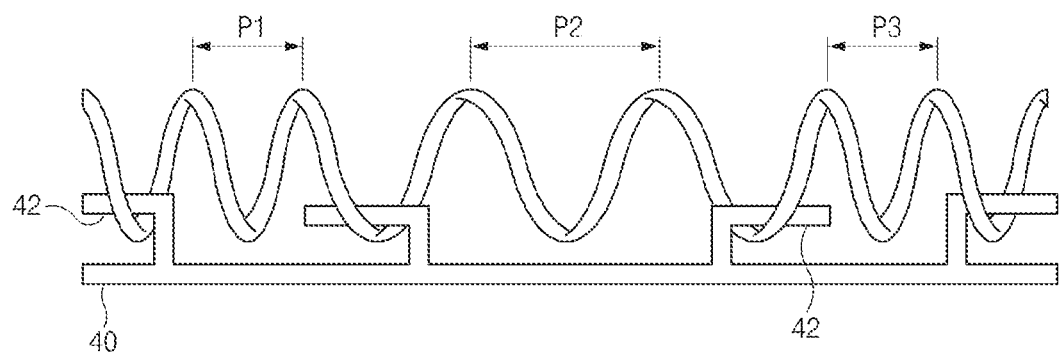

FIG. 8 is a view illustrating the coil spring welded to the first separator plate, and FIGS. 9A to 9C are views illustrating states that the coil spring is locked to a locking protrusion of the first separator plate.

The coil spring 60 is preferably fixed to the first separator plate 40 to maintain a specific position.

For example, as illustrated in FIG. 8, the coil spring 60 is welded and fixed to one surface of the first separator plate 40 at specific welding points W of the coil spring 60.

For example, as illustrated in FIGS. 9A and 9B, the first separator plate 40 may include at least one locking protrusion 42 protruding from the one surface of the first separator plate 40 and the coil spring 60 may be locked and fixed to the locking protrusions 42. In particular, as illustrated in FIG. 9C, the coil spring 60 is locked and fixed to the locking protrusions 42 such that pitches P1, P2, and P3 are varied depending on sections of the coil spring 60.

Figure 10A:
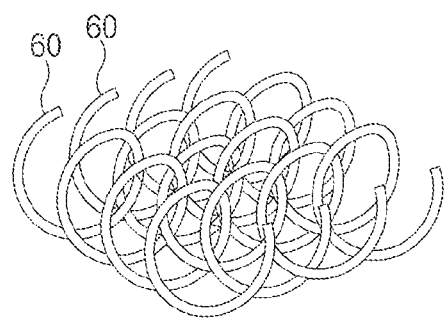
FIGS. 10A to 10C are views illustrating the states that coil springs are arranged to overlap with each other.
Figure 10B:
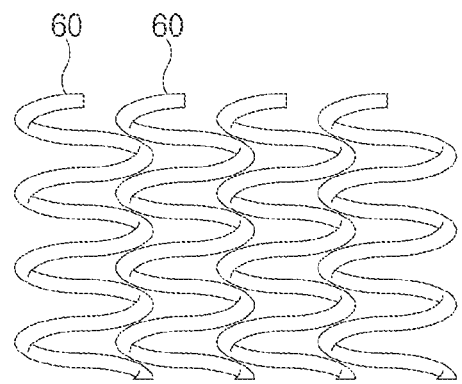
Figure 10C:
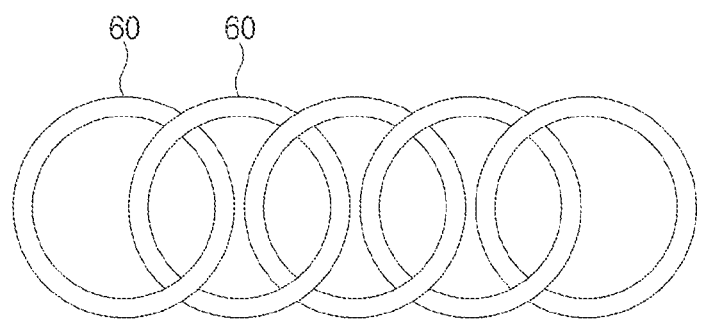

FIGS. 10A to 10C are views illustrating the states that the coil springs are arranged to overlap with each other.

The coil springs 60 may be installed with various installation distance therebetween.

For example, as illustrated in FIGS. 10A to 10C, coil springs 60 positioned adjacent to each other may be arranged to overlap with each other at a specific overlap ratio or may be arranged to be spaced apart from each other by a specific distance. The overlap between the coil springs 60 may refer to the state that the arrangement distance between the coil springs 60 is less than the diameter D2 of each coil spring 60 such that the coil springs 60 overlap with each other.

FIGS. 11 to 14 are views illustrating manners of adjusting the porosity of the reactant gas passage by using the coil springs.

The porosity of the reactant gas passage 90 is the ratio of the volume of a space, which is not occupied by the coil springs 60, in the whole volume of the reactant gas passage 90 and is inversely proportional to the ratio of the volume, which is occupied by the coil springs 60, in the whole volume of the reactant gas passage 90. In other words, the porosity of the reactant gas passage 90 is increased as the ratio of the volume, which is occupied by the coil springs 60, in the whole volume of the reactant gas passage 90 is decreased. Accordingly, the porosity of the reactant gas passage 90 may be adjusted by adjusting the ratio of the volume, which is occupied by the coil springs 60, in the whole volume of the reactant gas passage 90.

Therefore, the coil springs 60 may be provided such that the reactant gas passage 90 has a specific porosity for the design purpose of the unit cell 1. The porosity of the reactant gas passage 90 may be adjusted by using the coil springs 60 in various manners. For example, at least one of the diameter D1 of the spring wire, the pitch P of the coil springs 60, the diameter D2 of the coil springs 60, and the overlap ratio of the coil springs 60 is adjusted, thereby precisely adjusting the porosity of the reactant gas passage 90 to a specific target porosity.

Meanwhile, the flow rate of air passing through the reactant gas passage 90 is gradually reduced from an upstream 92 of the reactant gas passage 90 toward a downstream 94 of the reactant gas passage 90. Accordingly, a dry out phenomenon, in which moisture is reduced from a normal level, more frequently occurs toward the upstream 92 of the reactant gas passage 90. A flooding phenomenon, in which moisture is increased from the normal level, more frequently occurs toward the downstream 94 of the reactant gas passage 90. In this case, the upstream 92 of the reactant gas passage 90 refers to a region closer to the entrance of the reactant gas passage 90 and the downstream 94 of the reactant gas passage 90 refers to a region closer to the exit of the reactant gas passage 90.

In order to solve the problem, the coil springs 60 may be arranged to increase the porosity of the reactant gas passage 90 from the upstream 92 of the reactant gas passage 90 toward the downstream 94 of the reactant gas passage 90. Accordingly, the diffusivity of the air may be lowered due to the lower porosity at the upstream 92 of the reactant gas passage 90 and may be increased due to the higher porosity at the downstream 94 of the reactant gas passage 90. Accordingly, the coil springs 60 may minimize the dry out and flooding phenomena caused by the higher or lower flow rate of air.

The coil springs 60 may be arranged in various manners to increase the porosity of the reactant gas passage 90 from the upstream 92 of the reactant gas passage 90 toward the downstream 94 of the reactant gas passage 90 as described above.

Figure 11:
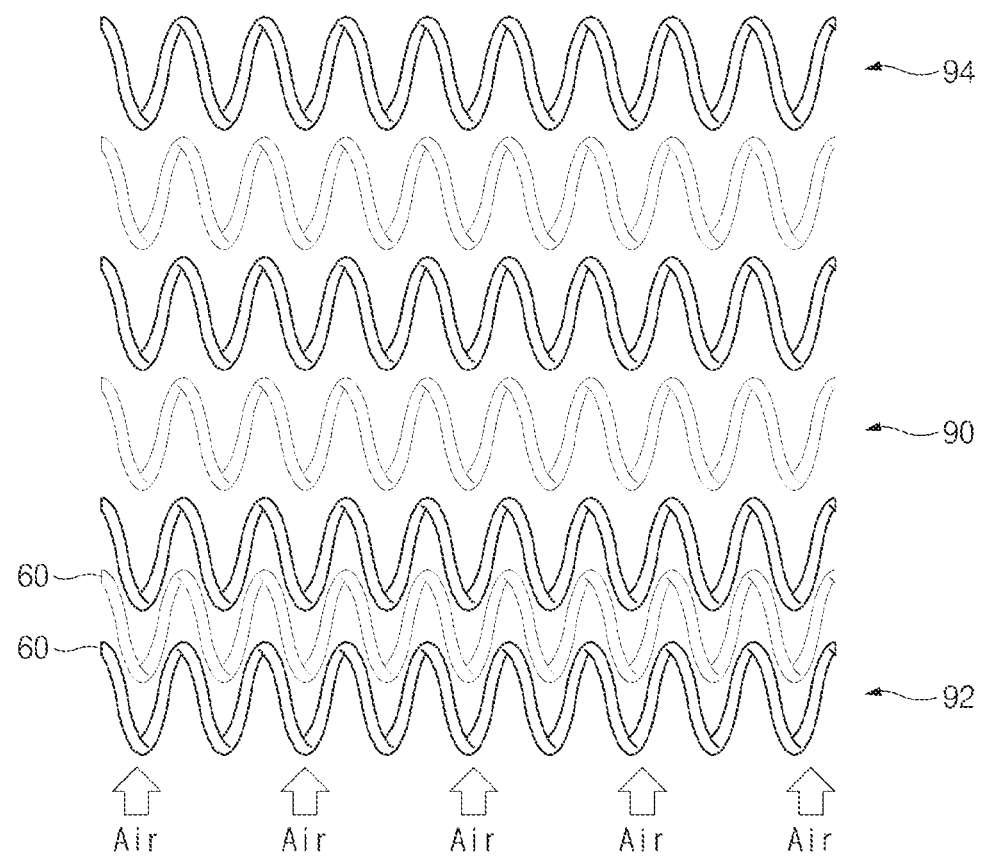
FIGS. 11 to 14 are views illustrating manners of adjusting the porosity of the reactant gas passage by using coil springs.

For example, as illustrated in FIG. 11, at least some of the coil springs 60 may be arranged to decrease the overlap ratio between the coil springs from the upstream 92 of the reactant gas passage 90 toward the downstream 94 of the reactant gas passage 90. In other words, the coil springs 60 may be arranged to increase the arrangement distance between the coil springs 60 from the upstream 92 of the reactant gas passage 90 from the downstream 94 of the reactant gas passage 90.

Figure 12:
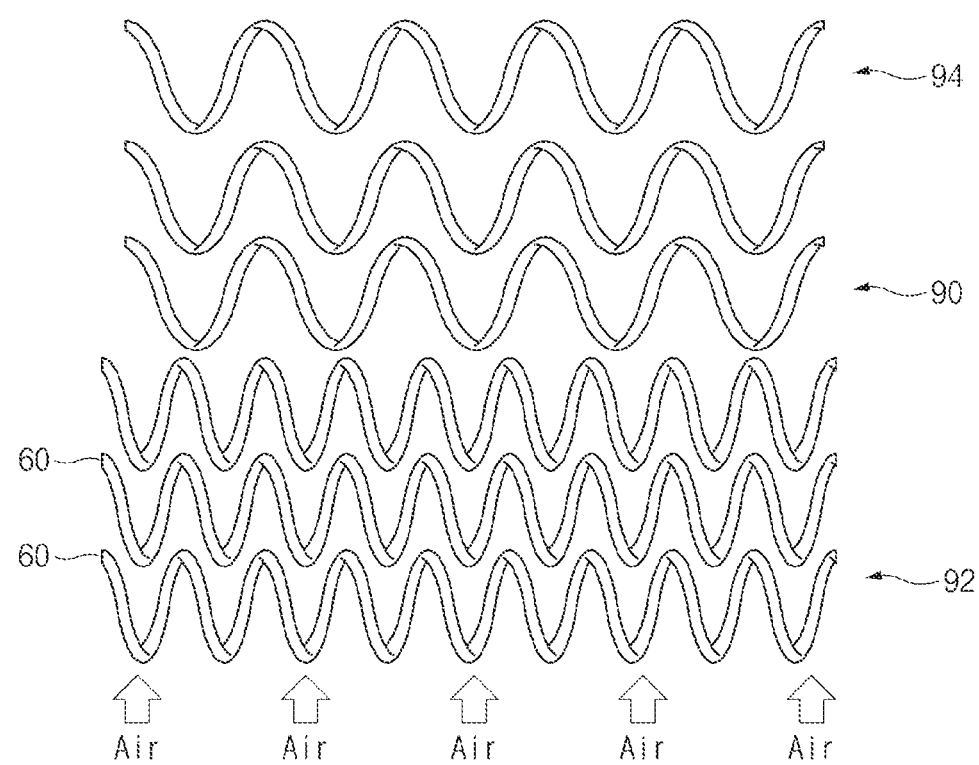

For example, as illustrated in FIG. 12, at least some of the coil springs 60 may be arranged such that a coil spring having a longer pitch P among the at least some of the coil springs 60 is positioned from the upstream 92 of the reactant gas passage 90 toward the downstream 94 of the reactant gas passage 90.

Figure 13:
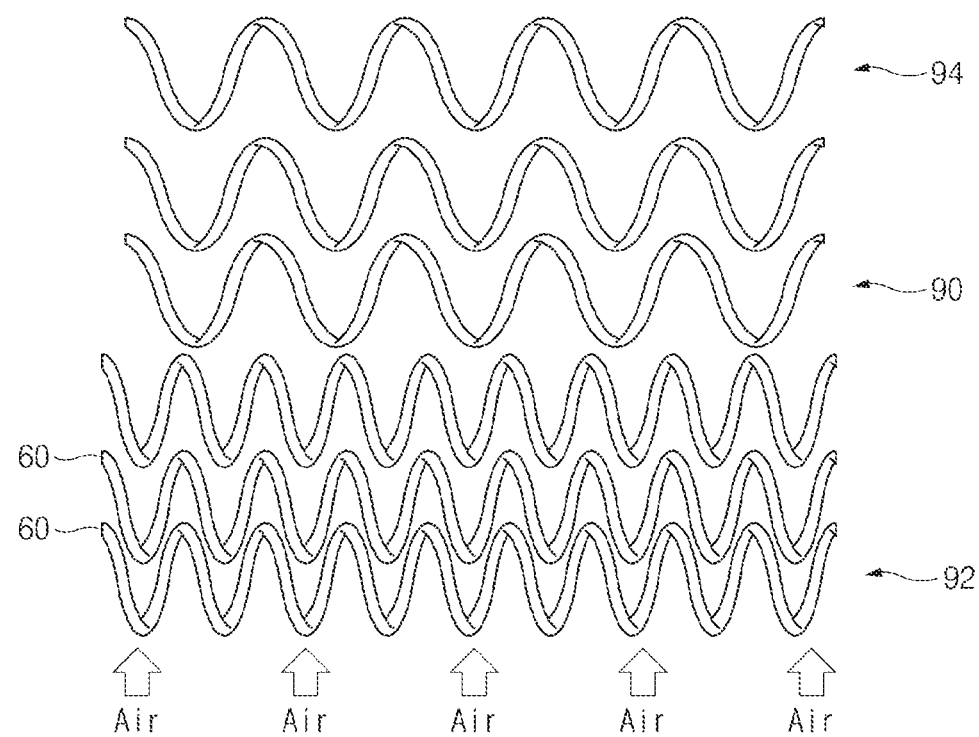

For example, as illustrated in FIG. 13, at least some of the coil springs 60 may be arranged to decrease the overlap ratio between the coil springs 60 from the upstream 92 of the reactant gas passage 90 toward the downstream 94 of the reactant gas passage 90 and arranged such that a coil spring having a longer pitch P among the at least some of the coil springs 60 is positioned from the upstream 92 toward the downstream 94.

Figure 14:
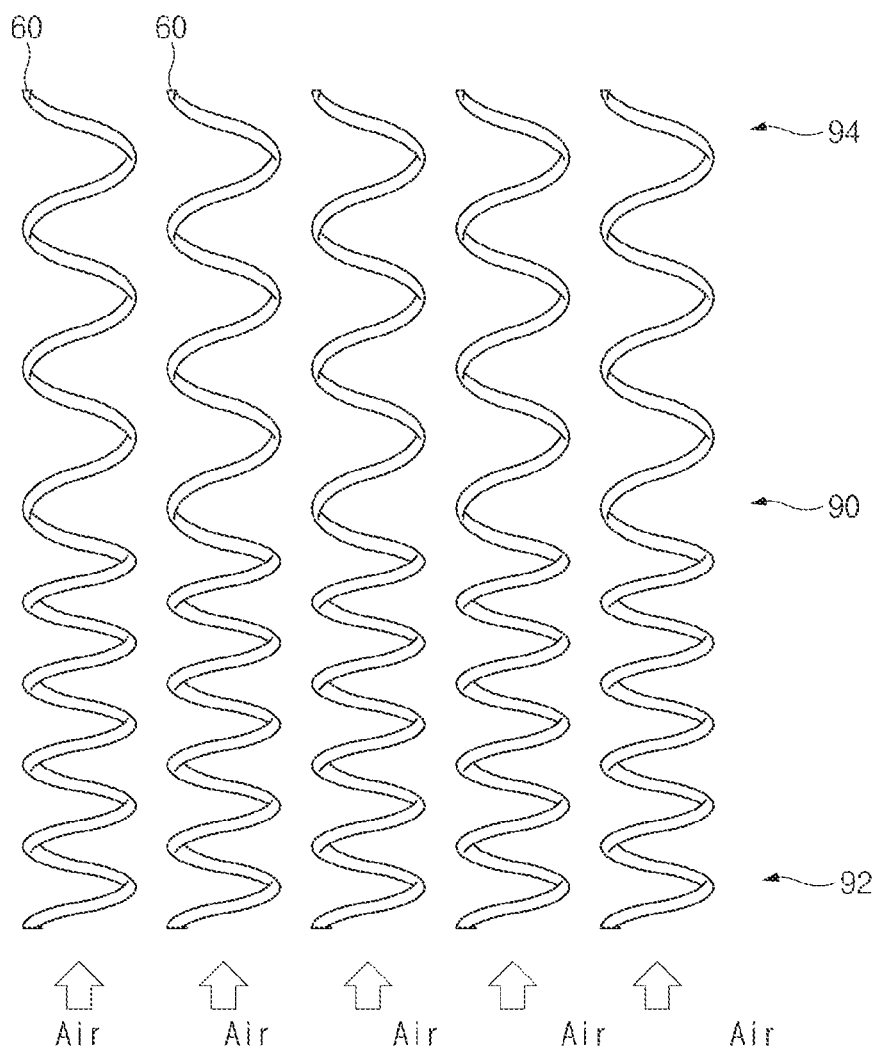

For example, as illustrated in FIG. 14, at least some of the coil springs 60 may be arranged to have pitches increased from the upstream 92 of the reactant gas passage 90 and the downstream 94 of the reactant gas passage 90.

For example, at least some of the coil springs 60 may be arranged such that a coil spring 60 having a spring wire of a less diameter D1 among the at least some of the coil springs 60 is positioned from the upstream 92 of the reactant gas passage 90 toward the downstream 94 of the reactant gas passage 90.

For example, at least some of the coil springs 60 may be arranged such that a coil spring 60 having a less diameter D2 among the at least some of the coil springs 60 is positioned from the upstream 92 of the reactant gas passage 90 toward the downstream 94 of the reactant gas passage 90.

Meanwhile, although the description has been made regarding the coil springs 60 arranged to increase the porosity of the reactant gas passage 90 from the upstream 92 of the reactant gas passage 90 toward the downstream 94 of the reactant gas passage 90, the present disclosure is not limited thereto. In other words, the coil springs 60 may be arranged such that at least one of the diameter D1 of the spring wire, the pitch P of the coil springs 60, the diameter D2 of the coil springs 60, and the overlap ratio of the coil springs 60 is varied to vary the porosity of the reactant gas passage 90 depending on the sections of the reactant gas passage 90.

For example, the coil springs 60 may be arranged such that the porosity of the reactant gas passage 90 is decreased toward the region having higher current density. In other words, the coil springs 60 may be arranged such that the ratio of the volume occupied by the coil springs 60 in the whole volume of the reactant gas passage 90 is increased toward the region having the higher current density. In this case, the contact areas between the coil springs 60 and the first gas diffusion layer 20 and the contact areas between the coil springs and the first separator plate 40 are increased toward the region having the higher current density. Therefore, the coil springs 60 lower the electric resistance between the first gas diffusion layer 20 and the first separator plate 40 in the region having the higher current density, thereby minimizing ohmic loss caused by the higher electric resistance.

As described, the coil springs 60 are interposed between the first gas diffusion layer 20 and the first separator plate 40, thereby forming the reactant gas passage 90 between the first gas diffusion layer 20 and the first separator plate 40 by using the coil spring 60. In the unit cell 1, the ratio of the volume of the reactant gas passage 90 occupied by the coil spring in the whole region of the reactant gas passage 90 is adjusted, thereby precisely adjusting the porosity of the reactant gas passage 90 for the design purpose of the unit cell 1 and precisely adjusting the electric resistance between the first gas diffusion layer 20 and the first separator plate 40 appropriately to the current density. Further, in the case of the unit cell 1, when the gas diffusion layers 20 and 30 are permanently shrunken and strained as long time elapses from the fabrication of the unit cell 1, the coil springs 60, which have been arranged to be elastically contracted between the first gas diffusion layer 20 and the first separator plate 40 by the coupling force applied to the unit cell 1, may be elastically restored. Accordingly, in the case of the unit cell 1, even if long time elapses from the fabrication of the unit cell 1, the permanent shrinkage strain of the gas diffusion layers 20 and 30 is compensated due to the elastic restoring force of the coil spring 60, thereby stably maintaining the contact state between components in the unit cell 1.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. A unit cell for a fuel cell, the unit cell comprising:
a membrane-electrode-assembly (MEA);
a gas diffusion layer disposed on one surface of the MEA;
a separator plate spaced from the gas diffusion layer; and
a coil spring interposed between the gas diffusion layer and the separator plate to elastically support the gas diffusion layer and the separator plate while electrically connecting the gas diffusion layer with the separator plate and providing a reactant gas passage to transfer reactant gas,
wherein the coil spring includes a plurality of coil springs, and
wherein the coil springs are provided such that porosity of the reactant gas passage is varied depending on sections of the reactant gas passage.

2. The unit cell of claim 1, wherein the coil springs are arranged such that an axial direction of each coil spring is perpendicular to a thickness direction of the MEA.

3. The unit cell of claim 1, wherein the coil springs are fixed to the separator plate.

4. The unit cell of claim 3, wherein the coil springs are welded to the separator plate.

5. The unit cell of claim 3, wherein the coil springs are bonded to the separator plate by an adhesive.

6. The unit cell of claim 1, wherein the separator plate includes a locking protrusion to lock one of the coil springs.

7. The unit cell of claim 6, wherein each coil spring is locked to the locking protrusion such that a spring pitch of the coil spring is varied depending on the sections of the reactant gas passage.

8. The unit cell of claim 1, wherein the coil springs are provided such that at least one characteristic of the coil springs is varied to vary the porosity of the reactant gas passage depending on the sections of the reactant gas passage, the characteristic selected from the group consisting of pitches of the coil springs, diameters of the coil springs, an overlap ratio between the coil springs, and diameters of spring wires of the coil springs.

9. The unit cell of claim 1, wherein the coil springs are arranged to increase the porosity of the reactant gas passage from an upstream of the reactant gas passage toward a downstream of the reactant gas passage.

10. The unit cell of claim 9, wherein the coil springs are arranged such that spring pitches of the coil springs are increased from the upstream of the reactant gas passage toward the downstream of the reactant gas passage.

11. The unit cell of claim 9, wherein the coil springs are arranged such that a coil spring having a longer spring pitch among the coil springs is positioned from the upstream of the reactant gas passage toward the downstream of the reactant gas passage.

12. The unit cell of claim 9, wherein the coil springs are arranged such that an overlap ratio between the coil springs is decreased from the upstream of the reactant gas passage toward the downstream of the reactant gas passage.

13. The unit cell of claim 9, wherein the coil springs are arranged such that an arrangement distance between the coil springs is increased from the upstream of the reactant gas passage toward the downstream of the reactant gas passage.

14. The unit cell of claim 9, wherein the coil springs are arranged such that a coil spring having a spring wire of a less diameter among the coil springs is positioned from the upstream of the reactant gas passage toward the downstream of the reactant gas passage.

15. The unit cell of claim 9, wherein the coil springs are arranged such that a coil spring having a less diameter among the coil springs is positioned from the upstream of the reactant gas passage toward the downstream of the reactant gas passage.

16. The unit cell of claim 1, wherein the coil springs are arranged such that an axial direction of each coil spring forms a specific angle with a flowing direction of the reactant gas.

17. A unit cell for a fuel cell, the unit cell comprising:
a membrane-electrode-assembly (MEA);
a gas diffusion layer disposed on one surface of the MEA;
a separator plate spaced from the gas diffusion layer; and
a coil spring interposed between the gas diffusion layer and the separator plate to elastically support the gas diffusion layer and the separator plate while electrically connecting the gas diffusion layer with the separator plate and providing a reactant gas passage to transfer reactant gas,
wherein the coil spring includes a plurality of coil springs,
wherein the coil springs are arranged such that an axial direction of each coil spring forms a specific angle with a flowing direction of the reactant gas, and
wherein at least some of the coil springs are arranged such that axial directions of the at least some of the coil springs are parallel to the flowing direction of the reactant gas.

18. The unit cell of claim 16, wherein at least some of the coil springs are arranged such that axial directions of the at least some of the coil springs are perpendicular to the flowing direction of the reactant gas.

19. A unit cell for a fuel cell, the unit cell comprising:
a membrane-electrode-assembly (MEA);
a gas diffusion layer disposed on one surface of the MEA;
a separator plate spaced from the gas diffusion layer; and
a coil spring interposed between the gas diffusion layer and the separator plate to elastically support the gas diffusion layer and the separator plate while electrically connecting the gas diffusion layer with the separator plate and providing a reactant gas passage to transfer reactant gas,
wherein the coil spring includes a plurality of coil springs, and
wherein the coil springs are arranged to decrease porosity of the reactant gas passage toward a region having higher current density.

* * * * *